(12) United States Patent
Kawakami

(10) Patent No.: US 8,942,622 B2
(45) Date of Patent: Jan. 27, 2015

(54) COMMUNICATION DEVICE AND COMMUNICATION SYSTEM

(75) Inventor: Daisuke Kawakami, Kanagawa (JP)

(73) Assignee: Sony Corporation (JP)

( * ) Notice: Subject to any disclaimer, the term of this patent is extended or adjusted under 35 U.S.C. 154(b) by 413 days.

(21) Appl. No.: 13/188,514

(22) Filed: Jul. 22, 2011

(65) Prior Publication Data

US 2012/0026129 A1    Feb. 2, 2012

(30) Foreign Application Priority Data

Jul. 30, 2010    (JP) ................................ P2010-171423

(51) Int. Cl.
| | |
|---|---|
| *H04B 5/00* | (2006.01) |
| *H04B 7/00* | (2006.01) |
| *G06F 1/16* | (2006.01) |
| *G06F 3/01* | (2006.01) |
| *H04B 13/00* | (2006.01) |

(52) U.S. Cl.
CPC ............ *G06F 1/1643* (2013.01); *G06F 1/1698* (2013.01); *G06F 3/011* (2013.01); *H04B 13/005* (2013.01)
USPC ........................................ 455/41.1; 455/41.2

(58) Field of Classification Search
CPC ........ H04B 13/005; H04B 7/26; H04B 7/005; H04B 17/00; H04L 1/00; H04L 29/06
USPC ................................................. 455/41.1, 41.2
See application file for complete search history.

(56) References Cited

U.S. PATENT DOCUMENTS

| 2006/0066588 | A1* | 3/2006 | Lyon et al. ..................... 345/173 |
|---|---|---|---|
| 2006/0165045 | A1* | 7/2006 | Kim et al. ..................... 370/349 |
| 2008/0122714 | A1* | 5/2008 | Ishihara et al. ............... 343/750 |
| 2009/0088114 | A1* | 4/2009 | Yoshida et al. ............... 455/269 |
| 2009/0305641 | A1* | 12/2009 | Kubono et al. ............ 455/67.11 |
| 2010/0054512 | A1* | 3/2010 | Solum ........................... 381/315 |

FOREIGN PATENT DOCUMENTS

| JP | 2006-318067 A | 11/2006 |
|---|---|---|
| JP | 2009-245402 A | 10/2009 |

* cited by examiner

*Primary Examiner* — Ping Hsieh
*Assistant Examiner* — Xin Jia
(74) *Attorney, Agent, or Firm* — Lerner, David, Littenberg, Krumholz & Mentlik, LLP

(57) ABSTRACT

A communication device includes an electrode, a communication unit configured to process a communication signal that is transmitted from/received by the electrode, and a control unit configured to control a communication operation in the electrode and the communication unit depending on a communication state.

8 Claims, 8 Drawing Sheets

FIG. 4
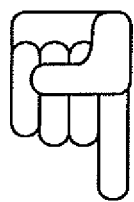
ONE FINGER
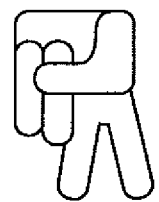
TWO FINGERS
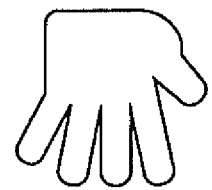
FIVE FINGERS
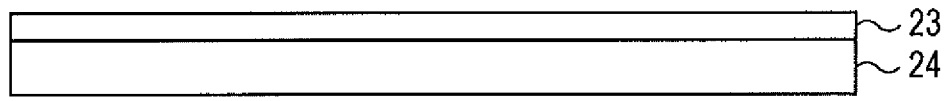
23
24

COMMUNICATION DEVICE AND COMMUNICATION SYSTEM

CROSS-REFERENCE TO RELATED APPLICATION

The present application claims priority from Japanese Patent Application No. JP 2010-171423 filed in the Japanese Patent Office on Jul. 30, 2010, the entire content of which is incorporated herein by reference.

BACKGROUND

The present technology relates to a communication device and a communication system that perform data communication by using a human body as a medium. Especially, the present technology relates to a communication device and a communication system that perform human body communication of an electric field communication system by mainly using a human body's property as a dielectric.

Two or more information devices can communicate with each other through various media such as a wire and a radio. A human body communication technology in which a human body is incorporated in a transmission channel has recently begun to attract lots of attention. Human body communication does not use a communication cable so as to be conveniently used in music data transmission between a portable music reproduction device and a head phone, for example. Further, in the human body communication, a communication signal passes through a body of a user and therefore information is hardly leaked. Accordingly, the human body communication can be used in secret communication such as personal authentication and account settlement, as well.

A human body has a property as a conductor and a property as a dielectric. A human body communication system using the property as a conductor is called a current type human body communication system. In the current type human body communication system, a transmission/reception electrode has to constantly contact with a human body, so that a user feels strangeness or discomfort. Thus, there is a problem in usability. Further, a human body communication system using the human body's property as a dielectric is called an electric field human body communication system. In this case, between transmission/reception electrodes which are disposed to interpose a human body therebetween, one of a radiation electric field which transmits in space, a dielectric electromagnetic field, and a quasi-electrostatic field which uses electrification of a human body (not propagation) is formed and a signal can be transmitted based on potential difference which acts in such field.

A human body communication system is commonly composed of a human body side communication device which is attached in a manner to contact with a human body skin and an apparatus side communication device which is installed near the human body. The human body side communication device is a portable terminal such as a cellular phone and a personal digital assistant (PDA) and an electrode of the portable terminal contacts with a human body skin in a state that a user carries the portable terminal. When a predetermined part such as a fingertip of a user touches an electrode of the apparatus side communication device, data is transmitted.

For example, Japanese Unexamined Patent Application Publication No. 2006-318067 and Japanese Unexamined Patent Application Publication No. 2009-245402 propose an apparatus side communication device used in human body communication. In the apparatus side communication device, a touch panel is provided, and a transparent electrode is superposed on a data display unit of the touch panel or a low-resistive peripheral electrode is closely disposed in a manner to surround a periphery of a surface which a fingertip touches. The apparatus side communication device performs the human body communication by using an input operation which is performed by a user with respect to the touch panel with his/her fingertip. According to a human body communication system using such apparatus side communication device of the touch panel type, human body communication is performed while a user performs a touch panel operation with his/her fingertip in a manner to follow an indication of a display. Thus, data can be efficiently processed.

However, the human body communication is easily affected by a ground and therefore communication is unstable disadvantageously. Further, an electrode superposed on a touch panel is easily affected by surrounding metal or noise. Therefore, it is concerned that data communication becomes unstable due to the size of a touch panel depending on the installation site of an apparatus side communication device.

In an application example such as user authentication, a size of communication data is small and processing is completed in a short amount of time, so that communication stability is not such a big matter. On the other hand, in an application example in which large-volume data such as music data and moving image data is transmitted in a certain period of time, communication stability is an important matter.

SUMMARY

It is desirable to provide a superior communication device and a superior communication system that can perform data communication by using a human body as a medium while maintaining communication stability.

A communication device according to a first embodiment of the present technology includes an electrode, a communication unit configured to process a communication signal that is transmitted/received by the electrode, and a control unit configured to control a communication operation in the electrode and the communication unit depending on a communication state.

According to a second embodiment of the present technology, the control unit of the communication device of the first embodiment increases electric field intensity in the electrode when communication is unstable, and suppresses the electric field intensity in the electrode when the communication is stable.

According to a third embodiment of the present technology, the control unit of the communication device of the first embodiment increases the number of times of packet retransmission in the communication unit or widens a communication band when the communication is unstable, and decreases the number of times of packet retransmission in the communication unit or narrows the communication band when the communication is stable.

According to a fourth embodiment of the present technology, the communication device of the first embodiment further includes a touch panel display. In the communication device, the electrode is a transparent electrode that is superposed on a display plane of the touch panel display.

According to a fifth embodiment of the present technology, in the communication device of the fourth embodiment, the touch panel display counts the number of user's fingers that simultaneously perform operation, and the control unit increases the electric field intensity in the electrode when the number of fingers, which is counted by the touch panel display, is equal to or smaller than a predetermined number, and suppresses the electric field intensity in the electrode when the number of fingers exceeds the predetermined number.

According to a sixth embodiment of the present technology, the control unit of the communication device of the fifth embodiment stops an electric field output in the electrode when the number of fingers, which is counted by the touch panel display, is zero.

According to a seventh embodiment of the present technology, in the communication device of the fourth embodiment, the touch panel display counts the number of user's fingers that simultaneously perform operation, and the control unit increases the number of times of packet retransmission in the communication unit or widens the communication band when the number of fingers, which is counted by the touch panel display, is equal to or smaller than a predetermined number, and decreases the number of times of packet retransmission in the communication unit or narrows the communication band when the number of fingers exceeds the predetermined number.

A communication system according to an eighth embodiment of the present technology includes a first communication device and a second communication device configured to transmit and receive a communication signal between electrodes that are opposed to each other, through a human body. In the communication system, at least one of the first communication device and the second communication device controls electric field intensity in the electrodes based on a result obtained by detecting stability of communication through the human body.

Here, "the system" is an assembly obtained by theoretically assembling a plurality of devices (or functional modules realizing specific functions), and whether respective devices or respective functional modules are in a single case or not does not particularly make any distinction.

According to the embodiments of the present technology, a superior communication device and a superior communication system that can perform data communication by using a human body as a medium while maintaining communication stability can be provided.

According to the first to third and eighth embodiments of the present technology, an apparatus side communication device determines a state of the human body communication. When the communication state is not good, the apparatus side communication device decreases a data communication rate or increases the electric field output of the human body communication so as to stabilize the communication, and when the communication state is good, the apparatus side communication device increases the data communication rate or decreases the electric filed output so as to realize stable human body communication.

According to the fourth to seventh embodiments of the present technology, the apparatus side communication device includes a touch panel on which the electrode is superposed and the touch panel is a multi-touch touch panel, so that the number of user's fingers that operate the touch panel (in other words, fingers that touch the electrode) can be detected. When the number of user's fingers that touch the electrode of the apparatus side communication device is small, the apparatus side communication device judges that the communication state is not good. Accordingly, the apparatus side communication device decreases the data communication rate and increases the electric field output of the human body communication, thereby being able to stabilize the communication. On the other hand, when the number of user's fingers that touch the electrode is large (or when the number of fingers is equal to or larger than a predetermined number), the apparatus side communication device judges that the communication state is good. Accordingly, the apparatus side communication device increases the data communication rate and decreases the electric field output, thereby being able to realize stable human body communication. Further, the user changes the number of fingers that touch the electrode depending on the size of data which is to be transmitted, thereby being able to intuitively understand the data transmission rate.

According to the sixth embodiment of the present technology, the user's operation of the touch panel leads the start of the human body communication, so that standby electricity of the communication device can be curbed.

Further intentions, features, and advantages of the present technology will become clear through the following embodiment of the present technology and a more detailed description based on the accompanying drawings.

BRIEF DESCRIPTION OF THE DRAWINGS

FIG. 4 illustrates a utilization example of a touch panel display of a multi-touch type;

DETAILED DESCRIPTION OF EMBODIMENTS

An embodiment of the present technology will now be described in detail with reference to the accompanying drawings.

Figure 1:
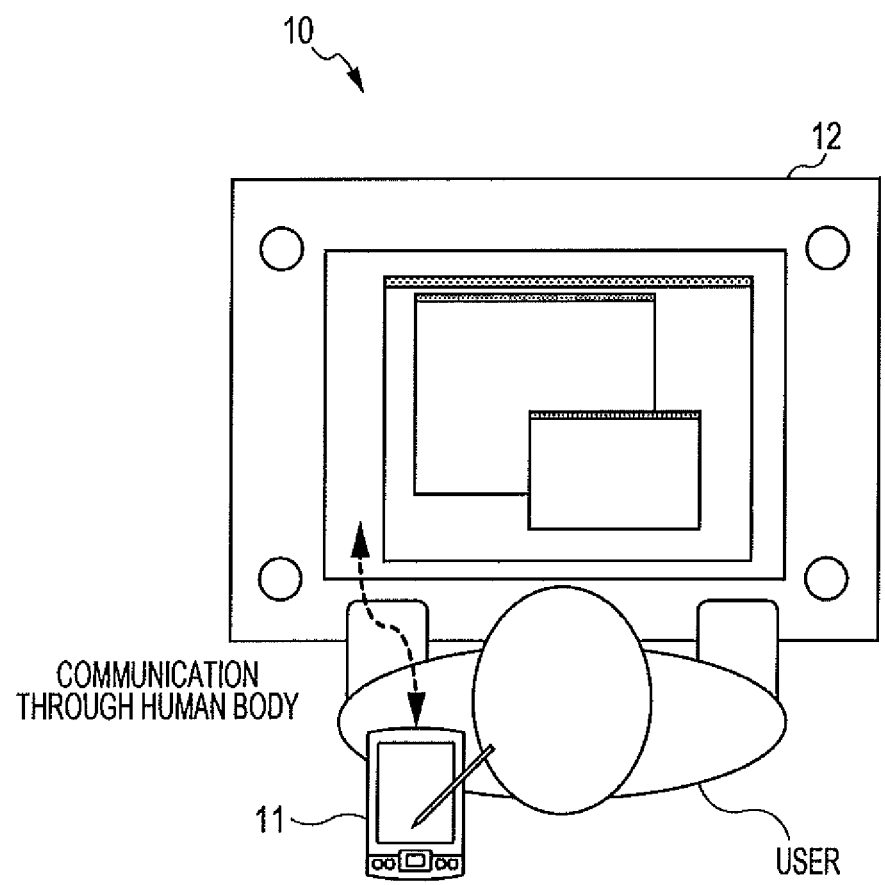
FIG. 1 schematically illustrates a utilization form of a human body communication system according to an embodiment of the present technology.

FIG. 1 schematically illustrates a utilization form of a human body communication system 10 according to the embodiment of the present technology. The human body communication system 10 shown in FIG. 1 includes a human body side communication device 11 which is composed of a portable terminal such as a PDA and an apparatus side communication device 12 which includes a touch panel.

The human body communication system 10 according to the embodiment is an electric field type human body communication system which uses a human body's property as a dielectric. When an electrostatic field is used, a user does not have to contact with a portable terminal serving as the human body side communication device 11 and therefore it is sufficient for the user to put the portable terminal in his/her pocket and carry it.

The apparatus side communication device 12 includes a touch panel display and a transparent electrode which is superposed on a display plane of the touch panel display (described later), and performs human body communication by using an input operation with respect to the touch panel by a user carrying the human body side communication device 11. Here, the user performs the input operation with respect to the touch panel from above or from a horizontal direction.

Figure 2:
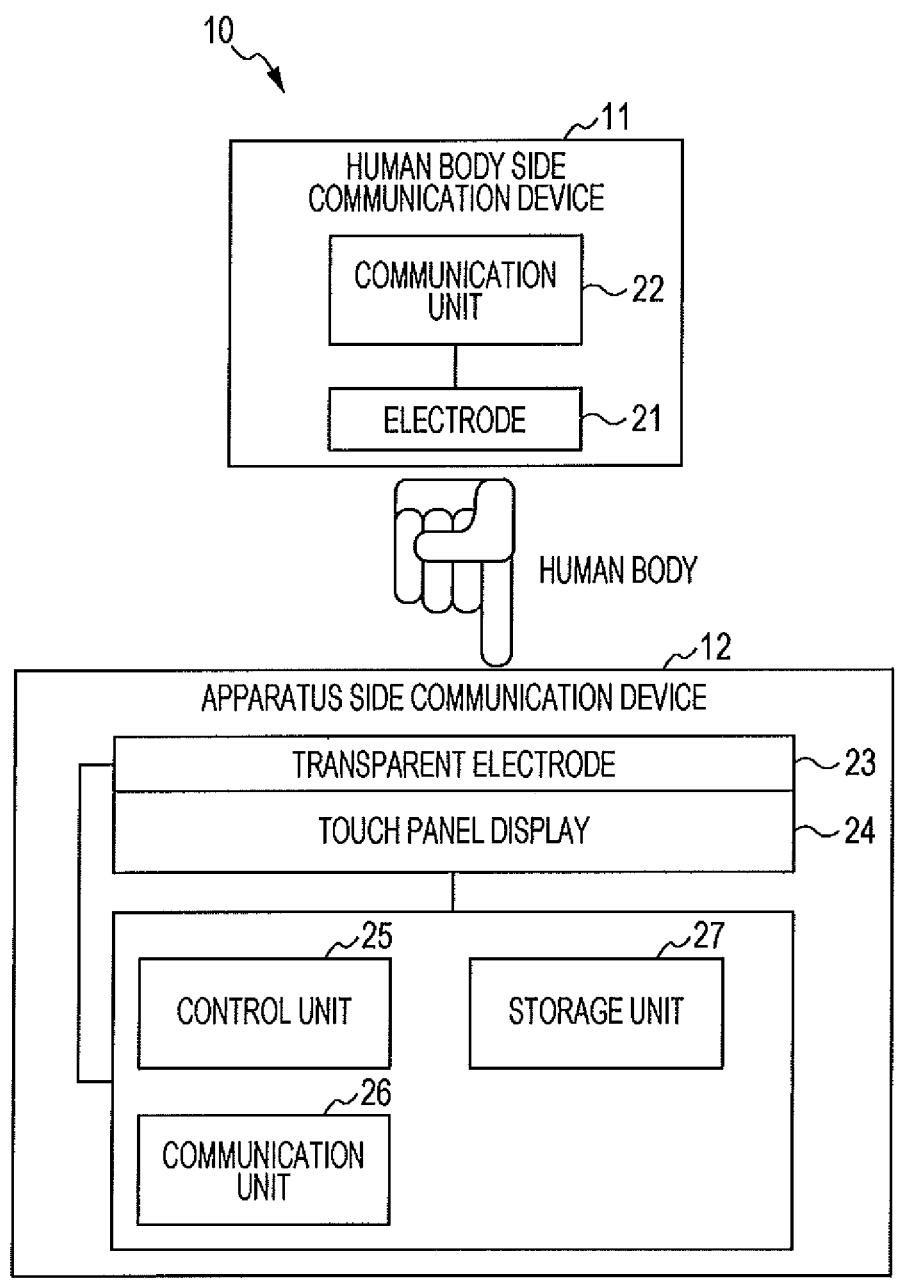
FIG. 2 schematically illustrates the internal configurations of a human body side communication device and an apparatus side communication device.

FIG. 2 schematically illustrates the internal configurations of the human body side communication device 11 and the apparatus side communication device 12.

The human body side communication device 11 includes an electrode 21 and a communication unit 22. In the human body communication using an electrostatic field, a user's skin does not have to directly contact with the electrode 21. The communication unit 22 performs signal processing of the human body communication or the like.

The apparatus side communication device 12 includes a touch panel display 24, a transparent electrode 23 which is superposed on a display side of the touch panel display 24, a control unit 25, a communication unit 26, and a storage unit 27.

An electric filed output from the transparent electrode 23, a communication rate, and a display output of the touch panel display 24 are controlled by the control unit 25. The signal processing of the human body communication or the like is performed by the communication unit 26, and communication setting and the like are stored in the storage unit 27.

The touch panel of the touch panel display 24 is a multi-touch type, that is, the touch panel is compatible to operation in which a plurality of points are simultaneously touched. Multi-touch detection is realized by an optical touch panel, an electrostatic capacitance touch panel, a resistive-film touch panel, an ultrasonic touch panel, and the like, for example. Further, a protection glass (not shown) may be interposed between the transparent electrode 23 and the touch panel display 24.

According to the human body communication system 10 using the apparatus side communication device 12 of the touch panel type, a position to be touched by a fingertip of a user can be indicated on the touch panel by a display of the touch panel and a position to be touched by the fingertip can be changed for every user or in every operation. Further, when a user touches data displayed on the touch panel display 24, data related to the data which the user has touched is acquired from the human body side communication device 11, being able to efficiently process the data.

However, the human body communication is easily affected by a ground and therefore communication is unstable disadvantageously. Further, the transparent electrode 23 which is superposed on the touch panel display 24 is easily affected by surrounding metal or noise, so that data communication easily becomes unstable due to the size of the touch panel depending on the installation site of the apparatus side communication device 12. Especially, the inventors think that most appropriate electric field output control should be performed in accordance with a contact state between a user and the transparent electrode 23 in the electric field type human body communication.

When the human body communication is applied for user authentication or the like, a size of communication data is small and processing is completed in a short amount of time. Therefore, communication stability is not such a big matter. On the other hand, in an application example in which large-volume data such as music data and moving image data is transmitted in a certain period of time, communication stability is an important matter.

For example, communication can be stabilized by decreasing a data communication rate. Here, there is no problem in a case such as user authentication in which a size of communication data is small and processing is completed in a short amount of time. However, it is inconvenient to perform communication by a low data communication rate in an application example in which large-volume data such as music data and moving image data is transmitted in a certain period of time.

Further, communication stability can be improved by increasing an electric field output for the human body communication. However, if the human body communication is performed with a high electric field output even when a contact state between a human body and an electrode is good and communication is relatively stable, electric power is wasted in the communication device.

Accordingly, in the human body communication system 10 according to the embodiment of the present technology, when a communication state is not good in the apparatus side communication device 12, a data communication rate is decreased and an electric field output of the human body communication is increased so as to stabilize the communication, and when the communication state is good, the data communication rate is increased and the electric field output is decreased so as to adaptively stabilize the human body communication.

Figure 3:
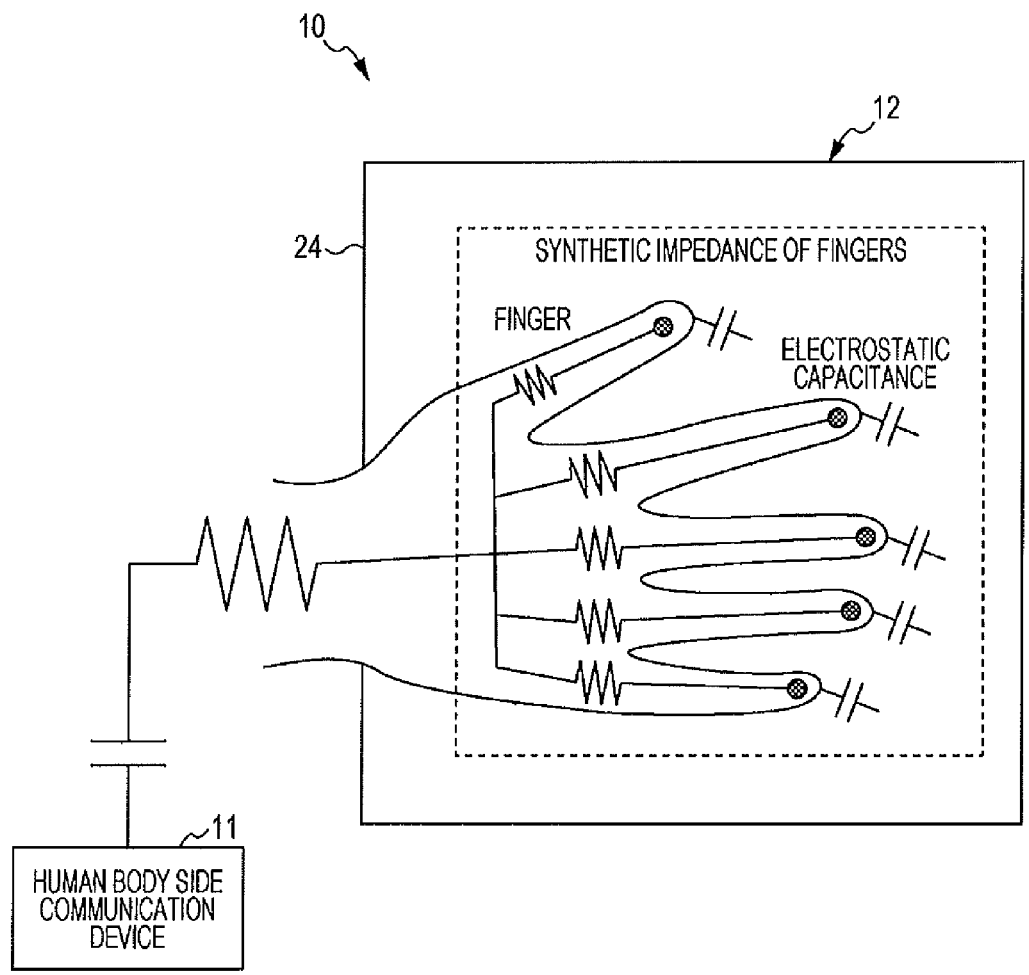
FIG. 3 illustrates an equivalent circuit of the human body communication system shown in FIG. 1.

Here, the human body communication system 10 is substituted to an equivalent circuit shown in FIG. 3 so as to consider a communication state of the human body communication. Since the impedances of respective fingers are extended from a palm in FIG. 3, the combined impedance of the five fingers is obtained as the parallel connection of their impedances. Therefore, the equivalent circuit of a human body can be replaced with the combined impedance obtained as the serial connection of the combined impedance of the five fingers in parallel, the impedance of the body part from the palm to the ground, and the ground impedance. Since contact areas of respective fingers are different from each other, an impedance when a finger touches the transparent electrode 23 differs in every finger. However, an impedance when no finger touches the transparent electrode 23 is large in the extent that differences among impedances when respective fingers touch the transparent electrode 23 can be ignored.

An impedance of each finger is assumed to be R so as to simplify the description. In a case where the number of fingers which touch the transparent electrode 23 is N (here, N is a positive integer of 5 or less), a combined impedance of the fingers is R/N. Therefore, as the number of user's fingers which touch the transparent electrode 23 is increased, the combined impedance of the fingers is decreased. Further, a difference between a combined impedance of a case where the number of fingers N which touch the transparent electrode 23 is 1 and a combined impedance of a case where the number of fingers N is 2 is large, while a difference between a combined impedance of a case where the number of fingers N is 2 and a combined impedance of a case where the number of fingers N is 3 is small. As a modification of the equivalent circuit shown in FIG. 3, not an impedance depending on the number of fingers which touch the transparent electrode 23 but an impedance of a contact part such as a palm can be adopted. A capacitance of a capacitor is nearly proportion to an area of an electrode (related art). Therefore, when a contact area of the human body becomes K times (here, K is a positive real number) large in the human body communication, the combined impedance becomes one Kth.

A touch panel sensor of the touch panel display 24 is a multi-touch type. Therefore, a user performs operation with respect to the touch panel display 24 not by using only one finger but by using two or more fingers simultaneously and the touch panel sensor can detect the number of fingers which simultaneously perform operation.

As described above, when the number of fingers which simultaneously operate the touch panel is increased, the combined impedance of fingers is decreased. Therefore, the human body communication is stabilized. Accordingly, stability of the human body communication can be estimated depending on the number of fingers performing an input operation with respect to the touch panel display 24. Alternatively, when a contact area of a palm or the like which operates the touch panel is increased, the combined impedance of the palm is decreased. Therefore, the human body communication is stabilized. Accordingly, stability of the human body communication can be estimated depending on a contact area of a palm or the like which operates the touch panel.

When the number of user's fingers which simultaneously touch the transparent electrode 23 is small (or when operation is performed by only one finger), it is judged that the communication state is not good. Accordingly, the data communication rate is decreased and the electric field output of the human body communication is increased, being able to stabilize the communication. On the other hand, when the number of user's fingers which simultaneously touch the transparent electrode 23 is large (or in a case of predetermined number or more of fingers), it is judged that the communication state is good. Accordingly, the data communication rate is increased and the electric field output is decreased, being able to realize stable human body communication. Further, the user changes the number of fingers which operate the touch panel display 24 depending on a size of data which is to be transmitted, so that the user can intuitively understand the data communication rate. Alternatively, the user changes a contact area of his/her palm which operates the touch panel display 24 depending on a size of data which is to be transmitted, so that the user can intuitively understand the data communication rate.

FIG. 4 shows a utilization example by a multi-touch operation of the touch panel display 24. The touch panel sensor detects if a user's contact point is one, two, or more. Further, the transparent electrode 23 acquires an electric field used for the human body communication from a finger which touches the transparent electrode 23.

Figure 5:
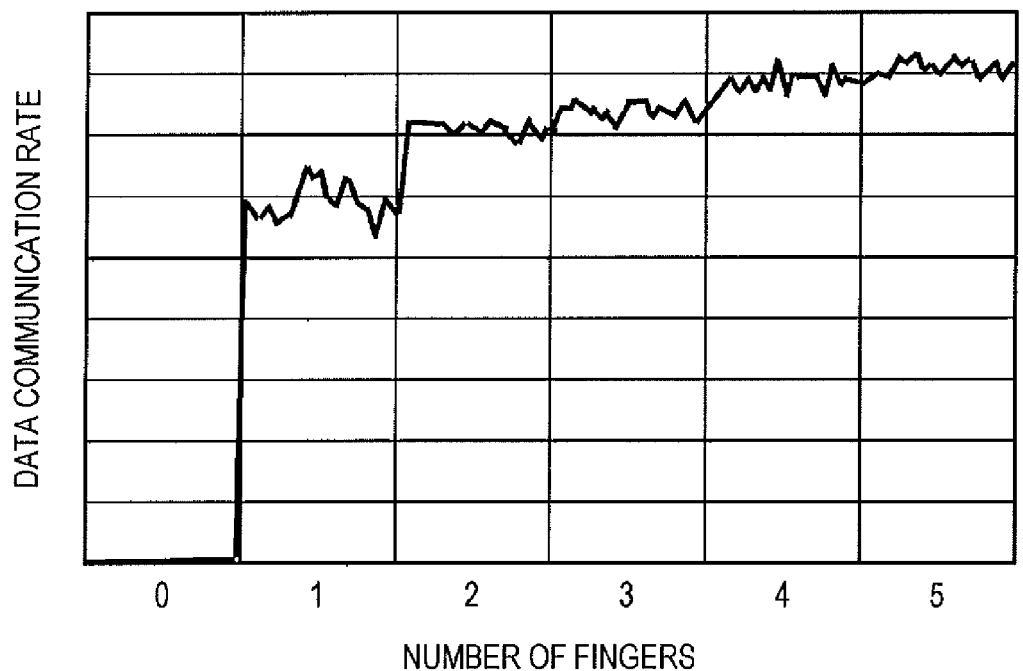
FIG. 5 illustrates a relationship between the number of user's fingers which simultaneously touch a transparent electrode and a data communication rate.

FIG. 5 shows a relationship between the number of user's fingers which simultaneously touch the transparent electrode 23 and the data communication rate. Here, a result of a case where a transfer control protocol (TCP) packet is communicated by the human body communication system 10 is shown. When the number of fingers which are used for the communication is one, the data communication rate largely varies. Thus, the communication is unstable.

As the number of fingers which are used for the communication is increased, detected current which is detected in the transparent electrode 23 is increased (refer to FIG. 2 of Japanese Unexamined Patent Application Publication No. 2009-245402, for example). This is also understood from the fact that the combined impedance R/N of fingers is decreased in accordance with the increase of the number of fingers N. Here, though the data communication rate is unstable when the number of fingers which are used for the communication is one or two, difference is not so obvious when the number of fingers is three or more.

Accordingly, the number of fingers which are used for the communication is counted by the touch panel sensor of the touch panel display 24, and the control unit 25 optimizes electric field intensity in the transparent electrode 23 in accordance with the number of fingers.

Specifically, when the number of fingers which is counted is one, the control unit 25 increases the electric field intensity in the transparent electrode 23 so as to enhance communication stability. When the number of fingers which is counted is two, the control unit 25 shifts the electric field intensity in the transparent electrode 23 to an intermediate level so as to secure the communication stability. On the other hand, when the number of fingers which is counted is three or more, the communication stability is secured. Therefore, the control unit 25 suppresses the electric field intensity in the transparent electrode 23 so as to reduce power consumption in the apparatus side communication device 12. Alternatively, as an area of a contact part, which is used for the communication, of a human body is increased, the detected current which is detected in the transparent electrode 23 is increased. When the contact area is equal to or smaller than a predetermined value, the communication is unstable and the data communication rate is low. When the contact area is equal to or larger than the predetermined value, the communication becomes stable and the data communication rate is increased. When the contact area becomes equal to or larger than a certain level, difference in data communication rates depending on difference in contact areas becomes to be not so obvious.

Here, the control unit 25 may control the number of times of packet retransmission or control a communication band as well as control the electric field intensity in the transparent electrode 23 so as to secure the communication stability.

Figure 6:
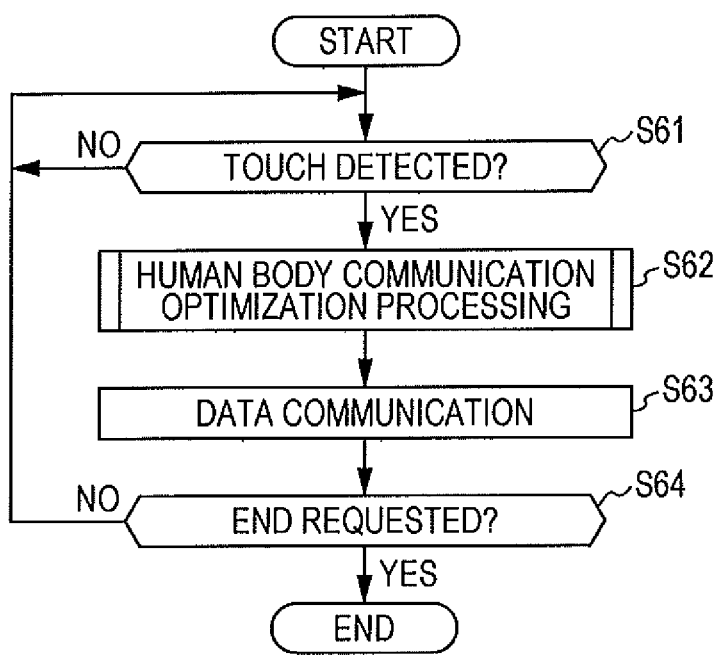
FIG. 6 is a flowchart showing a processing procedure which is performed by the apparatus side communication device when the apparatus side communication device performs human body communication with the human body side communication device.

FIG. 6 is a flowchart showing a processing procedure which is performed by the apparatus side communication device when the apparatus side communication device 12 performs human body communication with the human body side communication device 11.

When the touch panel sensor of the touch panel display 24 detects a touch of a finger of a user (Yes in step S61), the control unit 25 controls the electric field intensity of the transparent electrode 23, the number of times of packet retransmission, or the communication band in accordance with the number of the fingers which touch the touch panel so as to perform optimization processing of the human body communication (step S62).

Then, in the optimized state, data transmission is performed with the human body side communication device 11 by the human body communication (step S63).

Subsequently, an end of the communication is requested from an upper layer of the communication protocol or the human body side communication device 11 with which the apparatus side communication device 12 communicates (step S64), the control unit 25 ends the human body communication and ends this processing routine.

Figure 7:
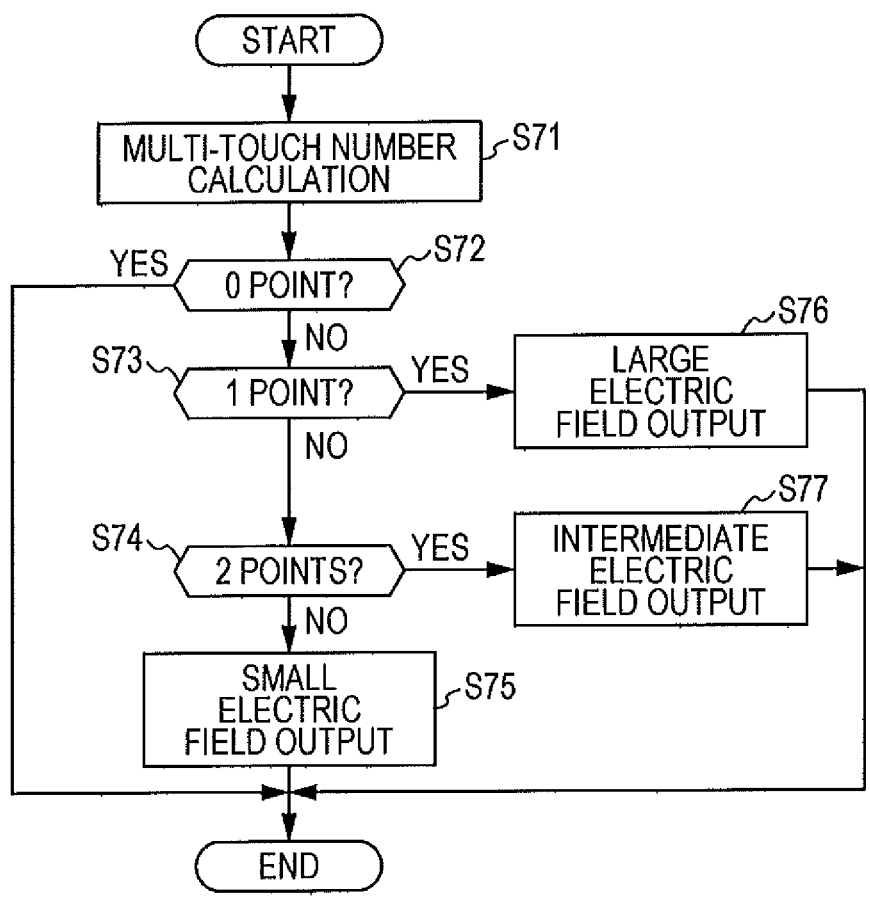
FIG. 7 is a flowchart showing a procedure of optimization processing of the human body communication.

FIG. 7 is a flowchart showing a procedure of the optimization processing of the human body communication which is performed in step S62 in the flowchart shown in FIG. 6. Here, the processing procedure shown in FIG. 7 is an example of a case where the optimization processing is performed by controlling the electric field intensity of the transparent electrode 23.

First, the touch panel sensor of the touch panel display 24 calculates the number of user's fingers which simultaneously touch the touch panel (step S71). Alternatively, detected current which is detected in the transparent electrode 23 is measured.

When the number of user's fingers which touch the touch panel is zero (Yes in step S72), the human body communication is not performed. Accordingly, the control unit skips all following processing steps so as to end this processing routine. At this time, the control unit 25 stops an electric field output in the transparent electrode 23. Alternatively, the control unit 25 may shift the apparatus side communication device 12 itself into a sleep state so as to reduce standby electricity. When the detected current which is detected in the transparent electrode 23 is equal to or smaller than the predetermined value, the human body communication is not performed. Accordingly, the control unit 25 skips all following processing steps so as to end this processing routine.

When the number of user's fingers which touch the touch panel is one (Yes in step S73), the control unit 25 increases the electric field intensity in the transparent electrode 23 (step S76) so as to stabilize the human body communication. When the detected current which is detected in the transparent electrode 23 is equal to or smaller than the predetermined value, it is considered that an area of a contact part with respect to the human body is small. Therefore, the control unit 25 increases the electric field intensity in the transparent electrode 23 so as to stabilize the human body communication.

When the number of user's fingers which touch the touch panel is two (Yes in step S74), the control unit 25 shifts the electric field intensity in the transparent electrode 23 to the intermediate level (step S77) so as to stabilize the human body communication. When the detected current which is detected in the transparent electrode 23 exceeds the predetermined value, the control unit 25 shifts the electric field intensity in the transparent electrode 23 to the intermediate level so as to stabilize the human body communication.

When the number of user's fingers which touch the touch panel is three or more (No in step S74), it is considered that stability of the human body communication is secured. Therefore, the control unit 25 decreases the electric field intensity in the transparent electrode 23 (step S75) so as to reduce power consumption of the apparatus side communication device 12. When the detected current which is detected in the transparent electrode 23 becomes larger than the predetermined value, the control unit 25 decreases the electric field intensity in the transparent electrode 23 so as to reduce power consumption of the apparatus side communication device 12.

Figure 8:
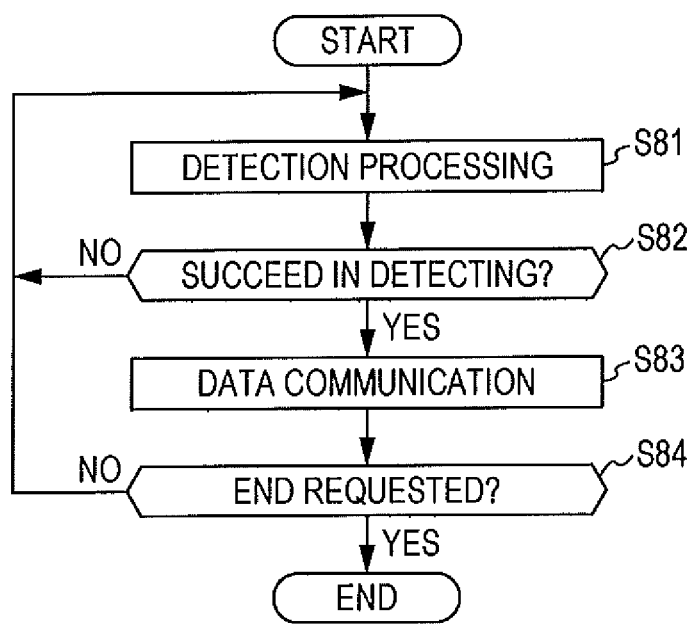
FIG. 8 is a flowchart showing a processing procedure which is performed by the human body side communication device when the human body side communication device performs the human body communication with the apparatus side communication device.

FIG. 8 is a flowchart showing a processing procedure which is performed by the human body side communication device 11 when the human body side communication device 11 performs the human body communication with the apparatus side communication device 12.

The communication unit 22 performs processing of detecting a human body communication signal through the electrode 21 (step S81). When the communication unit 22 succeeds in detecting the human body communication signal (Yes in step S82), the communication unit 22 performs data transmission with the apparatus side communication device 12 by the human body communication (step S83). Subsequently, when an end of the communication is requested from an upper layer of the communication protocol or the apparatus side communication device 12 with which the human body side communication device 11 communicates (step S84), the communication unit 22 ends the human body communication so as to end this processing routine.

According to the human body communication system 10 according to the embodiment of the present technology, the apparatus side communication device 12 performs the electric field output control corresponding to the number of user's fingers which simultaneously perform the touch panel operation, thereby being able to realize stable human body communication which is not influenced by the number of fingers. Alternatively, a user performs the electric field output control depending on an area of the contact part that is used for the human body communication, whereby stable human body communication which is not influenced by the size of the contact area can be realized.

Further, the user's operation of the touch panel leads the start of the human body communication of the apparatus side communication device 12, being able to reduce standby electricity.

It should be understood by those skilled in the art that various modifications, combinations, sub-combinations and alterations may occur depending on design requirements and other factors insofar as they are within the scope of the appended claims or the equivalents thereof.

The invention claimed is:

1. A communication device for use in human body communication, said communication device comprising:
   a touch panel display;
   an electrode, in which the electrode is a transparent electrode that is superposed on a display plane of the touch panel display;
   a communication unit configured to process a communication signal that is transmitted/received by the electrode; and
   a control unit configured to control a communication operation depending on whether communication through a user and the electrode is stable or unstable,
   in which the touch panel display is configured to enable a count of a number of user's fingers that simultaneously touch the transparent electrode or perform an operation, and
   in which the control unit utilizes the number of counted fingers to decide whether the communication between the user and the electrode is stable or unstable such that when the number of counted fingers is equal to or smaller than a predetermined number the control unit decides the communication between the user and the electrode is unstable and when the number of counted fingers is larger than the predetermined number the control unit decides the communication between the user and the electrode is stable, in which the predetermined number is two so that the control unit decides the communication between the user and the electrode is unstable when the number of counted fingers is two or less and decides the communication between the user and the electrode is stable when the number of counted fingers is more than two.

2. The communication device according to claim 1, wherein the control unit increases electric field intensity in the electrode when communication is unstable, and suppresses the electric field intensity in the electrode when the communication is stable.

3. The communication device according to claim 1, wherein the control unit increases the number of times of packet retransmission in the communication unit or widens a communication band when the communication is unstable, and decreases the number of times of packet retransmission in the communication unit or narrows the communication band when the communication is stable.

4. The communication device according to claim 1, wherein
   the control unit increases the electric field intensity in the electrode when the number of fingers, the number of fingers being counted by the touch panel display, is equal to or smaller than the predetermined number, and suppresses the electric field intensity in the electrode when the number of fingers exceeds the predetermined number.

5. The communication device according to claim 4, wherein the control unit stops an electric field output in the electrode when the number of fingers, the number of fingers being counted by the touch panel display, is zero.

6. The communication device according to claim 1, wherein
the control unit increases the number of times of packet retransmission in the communication unit or widens the communication band when the number of fingers, the number of fingers being counted by the touch panel display, is equal to or smaller than the predetermined number, and decreases the number of times of packet retransmission in the communication unit or narrows the communication band when the number of fingers exceeds the predetermined number.

7. The communication device according to claim 1, wherein the control unit stops the communication between the user and the electrode when the number of counted fingers is zero.

8. The communication device according to claim 1, in which when the communication is unstable the control unit increases electric field intensity in the electrode and decreases a data communication rate, and when the communication is stable the control unit suppresses the electric field intensity in the electrode and increases the data communication rate.

* * * * *